US006069569A

United States Patent [19]

Narusawa

[11] Patent Number: 6,069,569

[45] Date of Patent: *May 30, 2000

[54] RADIO PAGER

[75] Inventor: Hideki Narusawa, Shizuoka, Japan

[73] Assignee: NEC Corporation, Tokyo, Japan

[ * ] Notice: This patent is subject to a terminal disclaimer.

[21] Appl. No.: 08/696,607

[22] Filed: Aug. 14, 1996

[30] Foreign Application Priority Data

Aug. 15, 1995 [JP] Japan .................................... 7-207944

[51] Int. Cl.$^7$ ........................................ H04Q 7/14

[52] U.S. Cl. ........................................ 340/825.44

[58] Field of Search ......................... 340/825.44, 825.69, 340/825.46, 311.1; 455/426, 526, 575, 38.1, 38.2; 370/310, 312, 313; 368/72, 246, 12, 13; 1/1

[56] References Cited

U.S. PATENT DOCUMENTS

| | | | |
|---|---|---|---|
| 4,872,005 | 10/1989 | DeLuca et al. | 340/825.46 X |
| 5,043,721 | 8/1991 | May | 340/825.44 |
| 5,221,838 | 6/1993 | Gutman et al. | 340/825.44 X |
| 5,225,826 | 7/1993 | DeLuca et al. | 340/825.44 |
| 5,459,458 | 10/1995 | Richardson et al. | 340/825.44 X |
| 5,461,663 | 10/1995 | Motegi | 340/825.44 |
| 5,463,368 | 10/1995 | Tsunoda et al. | 340/309.15 |
| 5,623,273 | 4/1997 | Asai | 340/825.44 X |
| 5,627,525 | 5/1997 | Kudoh et al. | 340/825.44 |

FOREIGN PATENT DOCUMENTS

| | | |
|---|---|---|
| 0247601 | 12/1987 | European Pat. Off. . |
| 0498660 | 8/1992 | European Pat. Off. . |
| WO8906474 | 7/1989 | WIPO . |

*Primary Examiner*—Edwin C. Holloway, III
*Attorney, Agent, or Firm*—Sughrue, Mion, Zinn, Macpeak & Seas, PLLC

[57] ABSTRACT

A radio pager having an electronic pocketbook function or connectable to such a function and capable of using a schedule function. The pager is capable of storing time zones set by scheduling and alerting means each being allocated to a particular time zone, storing the time of receipt of a paging signal, comparing the time of receipt with the scheduled time zones, and thereby selecting one of the alerting means allocated to the time zone to which the time of receipt belongs. Therefore, only if the user of the pager sets the alerting means in relation to the time zones at the time of inputting a schedule, the alerting means can be automatically and easily controlled in accordance with the schedule information.

2 Claims, 3 Drawing Sheets

Fig. 3

6

STORAGE

| | TIME | ALERTING MEANS |
|---|---|---|
| 1ST TIME ZONE | 06:00 ~ 10:00 | VIBRATOR |
| 2ND TIME ZONE | 11:00 ~ 12:00 | L E D |
| 3RD TIME ZONE | 13:00 ~ 15:00 | SPEAKER |
| 4TH TIME ZONE | 17:00 ~ 21:00 | VIBRATOR |
| 5TH TIME ZONE | 21:30 ~ 23:30 | L E D |

RADIO PAGER

BACKGROUND OF THE INVENTION

The present invention relates to a radio pager and, more particularly, to a radio pager having an electronic pocketbook function or connectable to an electronic pocketbook and capable of using a schedule function.

A radio pager of the type described automatically alerts, after a schedule has been set, the user of the pager when the set time is reached. However, it is necessary for the user to set a desired one of a plurality of alerting means to be energized on the receipt of a call each time on the basis of the user's schedule. This prevents the user from setting or controlling the alerting means schedule by schedule in regard to the receipt of a call. Specifically, even when the user is in a quiet conference room or on a noisy train, only a single alerting means can alert the user to the receipt of a call. To replace the alerting means, the user must set the alerting means all over again, wasting time and labor.

SUMMARY OF THE INVENTION

It is therefore an object of the present invention to provide a radio pager capable of controlling alerting means for alerting the user of the pager to the receipt of a call on the basis of the time zone of a schedule.

In accordance with the present invention, a radio pager having an electronic pocketbook function or connectable to an electronic pocketbook and capable of using a schedule function has a plurality of kinds of alerting devices. A first storage stores a plurality of time zones set by scheduling and the plurality of kinds of alerting devices respectively allocated to the plurality of time zones. A second storage stores the time of receipt of a paging signal. A comparing section compares the time of receipt stored in the second storage with the plurality of time zones stored in the first storage by scheduling. A controller controls one of the plurality of alerting devices allocated to one of the plurality of time zones to which the time of receipt belongs.

BRIEF DESCRIPTION OF THE DRAWINGS

The above and other objects, features and advantages of the present invention will become apparent from the following detailed description taken with the accompanying drawings in which:

FIG. 3 shows a specific allocation of a plurality of alerting means to a plurality of time zones and stored in the illustrative embodiment.

DESCRIPTION OF THE PREFERRED EMBODIMENT

Figure 1:
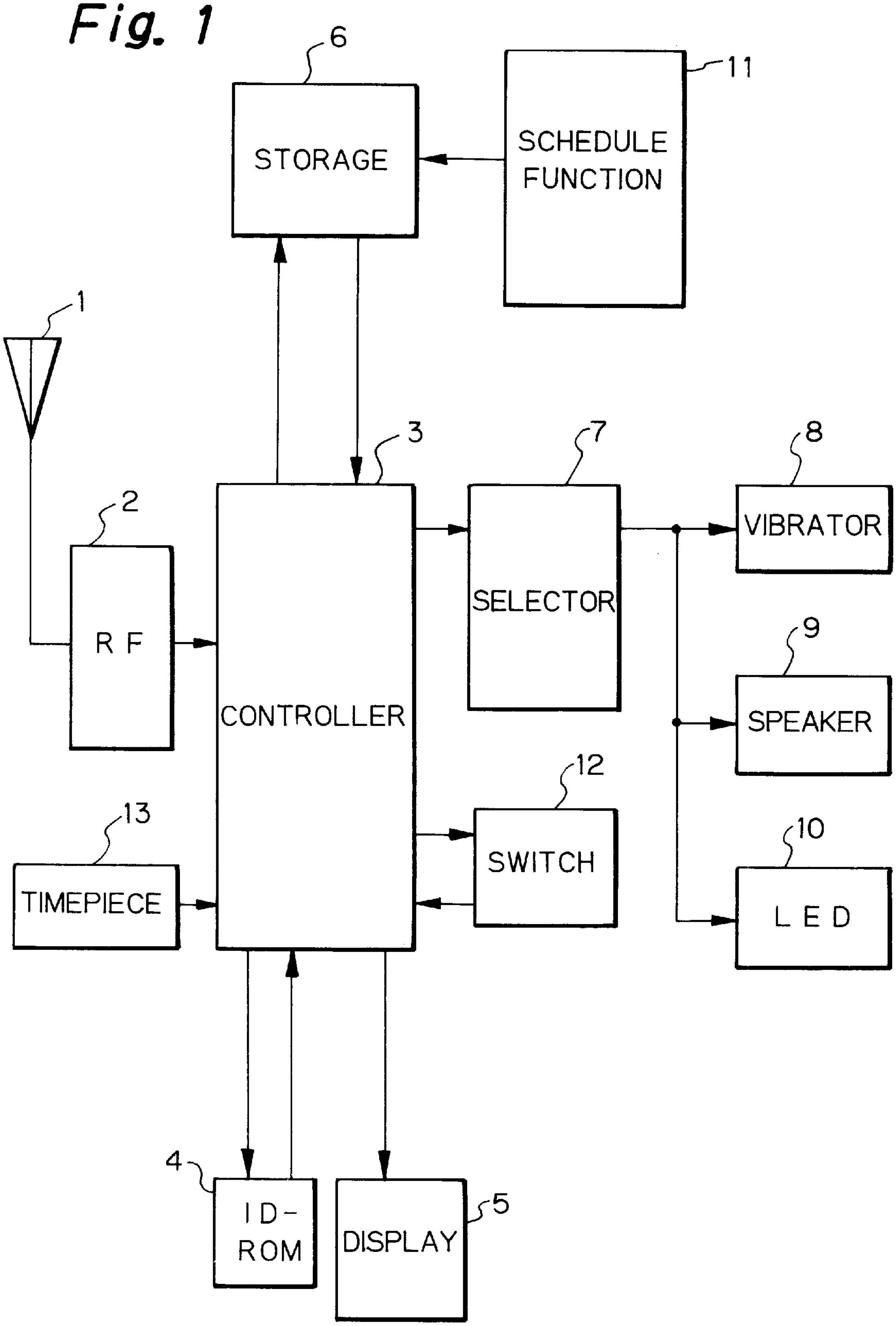
FIG. 1 is a block diagram schematically showing a radio pager embodying the present invention.

Referring to FIG. 1 of the drawings, a radio pager embodying the present invention is shown. As shown, the pager has a radio section or RF (Radio Frequency) section 2. A paging signal coming in through an antenna 1 is fed to the RF section 2 and demodulated thereby. An address number assigned to the pager is stored in an ID-ROM (Identification Read Only Memory) 4. A display 5 displays a message included in the received signal and a time. A vibrator 8 alerts the user of the pager to the receipt of a call by vibration. Also, a speaker 9 alerts to the user to the receipt by sound. Further, an LED (Light Emitting Diode) 10 alert the user to the receipt by light. These three kinds of alerting means 8, 9 and 10 are selectively energized by a selector 7, as desired. A switch 12 is operated by the user to set desired alert time data and desired alerting means. Alert time zones entered on the switch 12, the alerting means also entered on the switch 12 and each allocated to particular one of the time zones, and the time of receipt are written to a storage 6. A schedule function 11 has an electronic pocketbook function or is connectable to an electronic pocketbook. A timepiece 13 generates data representative of the current time. A controller 3 controls the entire radio pager.

When the above pager has an electronic pocketbook function, the schedule function 11 will be included in the pager. If the pager is connectable to an electronic pocketbook in order to use a schedule function available therewith, then the schedule function 11 will be built in the notebook. When the schedule function 11 is included in the pager, the user allocates any one of the alerting means 8, 9 and 10 to a particular time zone when inputting a schedule. As a result, the alerting means are written to the storage 6 in correspondence with the time zones of the schedule. When the schedule function 11 is built in the electronic pocketbook, the controller 3 writes the time data of a schedule set on the function 11 in the storage 6 when the pager is connected to the pocketbook, while displaying them on the display 5. Then, the controller 3 allows the user of the pager to set the alerting means on the switch 12, while writing the alerting means in the storage 6 in correspondence to the time zones.

In operation, a paging signal coming in through the antenna 1 is demodulated by the RF section 2. The controller 3 compares the an address signal included in the demodulated signal with the address signal stored in the ID-ROM 4. If the two address signals compare equal, the controller 3 stores the time of receipt of the paging signal therein. Then, the controller 3 determines one of the time zones stored in the storage 6 to which the time of receipt belongs, and the alerting means allocated to the above time zone. The controller 3 delivers a signal indicative of the above alerting means to the selector 7. In response, the selector 7 selects and drives the indicated alerting means, i.e., vibrator 8, speaker 9 or LED 10, thereby alerting the user of the pager to the receipt of a call. If the received paging signal includes a message, then the message is displayed on the display 5.

Figure 2:
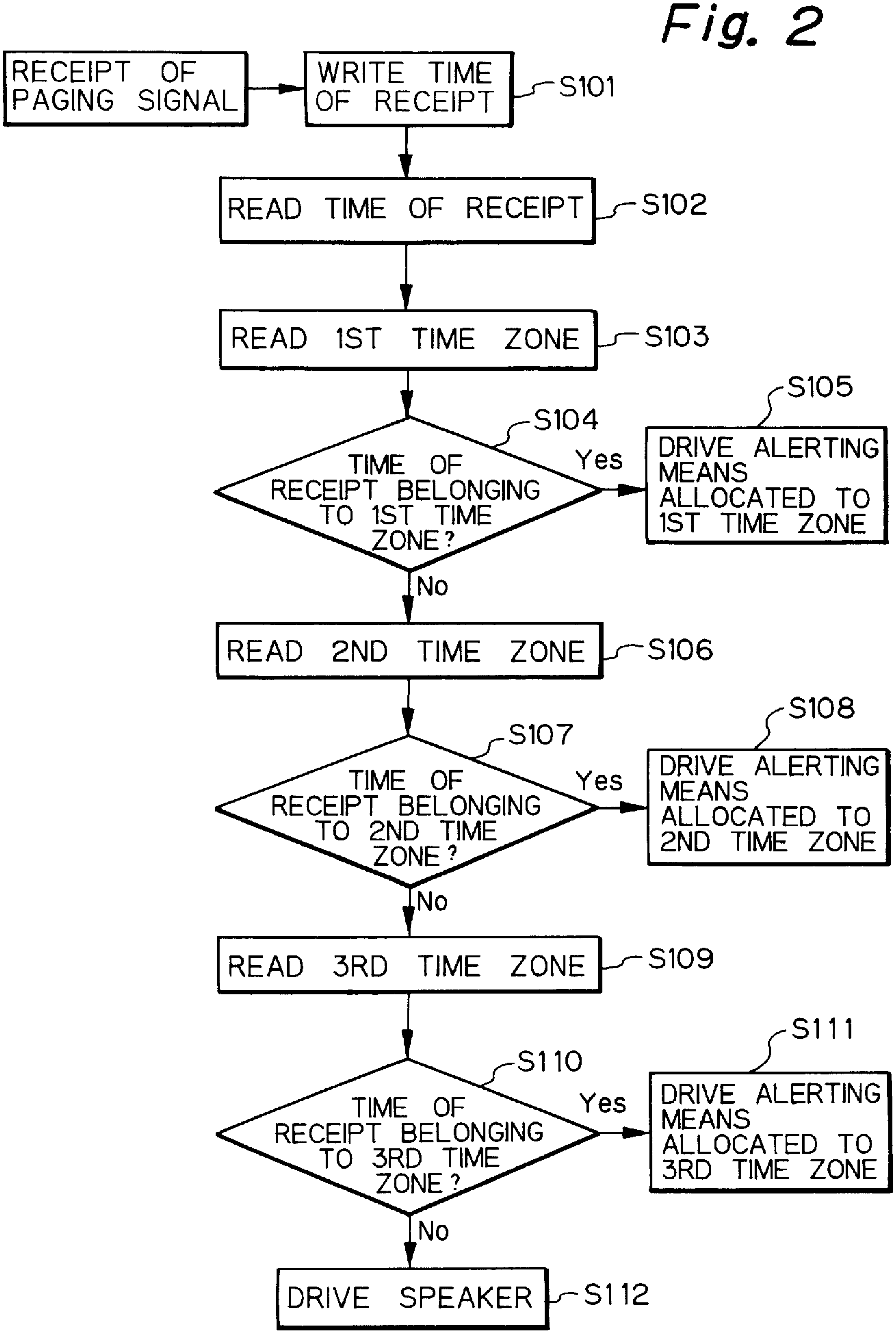
FIG. 2 is a flowchart demonstrating a specific operation of the illustrative embodiment.

How the three alerting means 8, 9 and 10 are selectively energized will be described more specifically with reference to FIGS. 1, 2 and 3. In FIG. 2, assume that the address number included in the received paging signal is identical with the address number stored in the ID-ROM 4. Then, the controller 3 stores the time of receipt of the paging signal (step S101), reads it out (step S102), and reads out a first set time zone (step S103). The controller 3 determines whether or not the time of receipt belongs to the first time zone (step S104). If the answer of the step S104 is positive (Yes), the controller 3 causes the alerting means assigned to the first time zone to alert the user to the receipt of the call. If the answer of the step S104 is negative (No), the controller 3 reads out a second set time zone (step S106) and determines whether or not the receipt of time belongs to the second time zone (step S107). If the answer of the step S107 is Yes, the controller 3 causes the alerting means allocated to the second time zone to alert the user to the receipt of a call (step S108). If the answer of the step S107 is No, the controller 3 reads out a third set time zone (step S109) and compares the time of receipt with the third time zone (step S110). If the answer of the step S110 is Yes, the controller 5 causes the alerting means allocated to the third time zone to alert the user to the receipt of a call (step S111). If the answer of the step S110 is No, the controller 3 causes the speaker to alert the user to the receipt of a call (step S112).

FIG. 3 shows a specific allocation of the three alerting means 8, 9 and 10 to a first to a fifth time zone set beforehand and stored in the storage 6. As shown, when the time of receipt belongs to the first time zone between 06.00 and 10.00, the vibrator 8 is energized. When the time of receipt belongs to the second time zone between 11.00 and 12.00, the LED 10 is energized. When the time of receipt belongs to the third time zone between 13.00 and 15.00, the speaker 9 is energized. In the same manner, in the fourth time zone between 17.00 and 21.00 and the fifth time zone between 21.30 and 23.30, the vibrator 8 and LED 10 are respectively energized.

In summary, in accordance with the present invention, a radio pager is capable of storing time zones set by scheduling and alerting means each being assigned to a particular time zone, storing the time of receipt of a paging signal, comparing the time of receipt with the time zones, and thereby selecting one of the alerting means allocated to the time zone to which the time of receipt belongs. Therefore, only if the user of the pager sets the alerting means in relation to the time zones at the time of inputting a schedule, the alerting means can be automatically and easily controlled in accordance with the schedule information. It follows that even in a conference room or similar quiet environment or in a train or similar noisy environment, the user can be surely alerted to the receipt of a call without annoying the others or despite surrounding noise.

Various modifications will become possible for those skilled in the art after receiving the teachings of the present disclosure without departing from the scope thereof.

What is claimed is:

1. A radio pager having an electronic pocketbook or being connectable to an electronic pocketbook and capable of using a schedule function, said radio pager comprising:

a plurality of alerting means;

first storing means for storing a plurality of time zones set by scheduling and identification information for identifying said plurality of alerting means respectively allocated to said plurality of time zones;

a timepiece for generating time data representing a time of receipt of a paging signal;

second storing means for storing said time of receipt of said paging signal;

comparing means for comparing said time of receipt stored in said second storing means with said plurality of time zones stored in said first storing means, wherein said comparing means performs said comparing at said time of receipt of said paging signal and outputs a result which automatically selects one of said plurality of alerting means at said time of receipt of said paging signal; and control means for controlling, in response to said result, said one of said plurality of alerting means allocated to one of said plurality of time zones to which said time of receipt belongs.

2. A radio pager as claimed in claim 1, wherein when said radio pager is connected to said electronic pocketbook by a connecting mechanism, said plurality of time zones, set when said schedule is entered on said electronic pocketbook, and said identification information identifying said plurality of alerting means, respectively allocated to said, plurality of time zones, are written to said first storing means.

* * * * *